(12) United States Patent
Błachut et al.

(10) Patent No.: US 11,746,844 B2
(45) Date of Patent: Sep. 5, 2023

(54) ROTOR CLIP FOR BRAKE ASSEMBLY

(71) Applicant: Goodrich Corporation, Charlotte, NC (US)

(72) Inventors: Aleksander Andrzej Błachut, Ozimek (PL); Mirosław Stanisław Sosnowski, Mirków (PL); Marcin Szymon Sokołowski, Wojsławice-Kolonia (PL); Maciej Wojciech Krulak, Warsaw (PL); Karol Straś, Jelenia Góra (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/901,684

(22) Filed: Sep. 1, 2022

(65) Prior Publication Data

US 2023/0116460 A1  Apr. 13, 2023

(30) Foreign Application Priority Data

Sep. 24, 2021  (EP) .................................... 21461600

(51) Int. Cl.
  *F16D 65/10* (2006.01)
  *F16D 65/12* (2006.01)
  (Continued)

(52) U.S. Cl.
  CPC ........ *F16D 65/126* (2013.01); *B60B 27/0052* (2013.01); *B64C 25/36* (2013.01);
  (Continued)

(58) Field of Classification Search
  CPC ...... F16D 65/123; F16D 65/126; F16D 55/36; F16D 2065/1392; F16D 2250/0084; B60B 27/0052; B64C 25/36
  (Continued)

(56) References Cited

U.S. PATENT DOCUMENTS

| 4,465,165 A | 8/1984 | Bok |
| 4,511,021 A * | 4/1985 | Grider .................. F16D 65/126 188/218 XL |

(Continued)

FOREIGN PATENT DOCUMENTS

JP  S60234140  11/1985

OTHER PUBLICATIONS

European Patent Office; European Search Report dated Feb. 28, 2022 in Application No. 21461600.5.

*Primary Examiner* — Christopher P Schwartz
(74) *Attorney, Agent, or Firm* — SNELL & WILMER L.L.P.

(57) ABSTRACT

A clip for a rotor disk of a brake assembly, the clip comprising: a first half comprising a first sheet metal strip having a body portion and a first end and a second end bent in a first direction relative to the body portion; and a second half comprising a second sheet metal strip having a body portion having a length the same as the length of the body portion of the first sheet metal strip, the second sheet metal strip having a first end and a second end bent in a second direction, opposite to the first direction, relative to the body portion of the second sheet metal strip; and wherein one of the first end of the first sheet metal strip and the first end of the second sheet metal strip is provided with a first pin protruding from the end.

7 Claims, 4 Drawing Sheets

(51) Int. Cl.
  *B60B 27/00* (2006.01)
  *B64C 25/36* (2006.01)
  *F16D 65/02* (2006.01)
  *F16D 55/36* (2006.01)

(52) U.S. Cl.
  CPC .......... *F16D 65/123* (2013.01); *F16D 55/36* (2013.01); *F16D 2065/1392* (2013.01); *F16D 2250/0084* (2013.01)

(58) Field of Classification Search
  USPC ........................................ 188/73.2, 218 XL
  See application file for complete search history.

(56) References Cited

U.S. PATENT DOCUMENTS

| | | | | |
|---|---|---|---|---|
| 4,557,356 A * | 12/1985 | Petersen | ............... | F16D 65/126 188/218 XL |
| 4,863,001 A * | 9/1989 | Edmisten | ............... | F16D 65/126 188/218 XL |
| 7,802,758 B2 * | 9/2010 | Cress | .................... | F16D 65/126 188/73.2 |
| 10,221,905 B2 * | 3/2019 | Stevenson | ............ | F16D 65/126 |
| 10,436,265 B2 | 10/2019 | Stevenson | | |
| 2008/0296109 A1 | 12/2008 | Cress | | |
| 2018/0128331 A1 | 5/2018 | Stevenson | | |
| 2019/0017562 A1 | 1/2019 | Fiala et al. | | |
| 2019/0048949 A1 | 2/2019 | Stevenson | | |

\* cited by examiner

_US 11,746,844 B2_

ROTOR CLIP FOR BRAKE ASSEMBLY

CROSS-REFERENCE TO RELATED APPLICATIONS

This application claims priority to, and the benefit of, EP Patent Application No. 21461600.5, filed Sep. 24, 2021 (DAS Code 19C6) and titled "ROTOR CLIP FOR BRAKE ASSEMBLY," which is incorporated by reference herein in its entirety for all purposes.

FIELD

The present disclosure relates to a clip for the rotor of a brake assembly.

BACKGROUND

Braking assemblies for applying a braking force to a rotating body e.g. a wheel, are well known and typically comprise a brake stack of alternating rotor and stator disks. The braking assembly is actuated by applying a force to an actuator e.g. a piston which applies force to a pressure plate which compresses the rotor and stator disks of the brake stack together to cause deceleration and braking by friction. Typically, the rotor disks are provided with circumferential drive lugs via which the compressive force is applied to the rotor disks. Such braking mechanisms are well known and will not be described further in any detail. Brake assemblies operating in this way are common in aircraft and other vehicles. Where a high braking force is required, such as in aircraft, the rotor disks have to be made of a strong, heavy duty material such as a strong steel material or, more recently, carbon material. Carbon is preferred in many applications e.g. in aircraft, because it is more lightweight than steel for the same strength. Reduced weight of parts in or on aircraft allow for a reduction in fuel consumption and, in turn, reduced $CO_2$. emissions. Because of the material used, the rotor disks are expensive parts. In order to prolong the life of these disks, rotor clips are typically provided on the outer circumference of the disk e.g. on the drive lugs to provide some protection against wear of the rotor disk material. The clips transfer the drive force to the rotor drive lug. These clips, when they become worn, can be easily and relatively inexpensively replaced, allowing the more expensive rotor disks to be reused and extending their life.

Various designs for rotor clips are known, these include a spring clip secured over the rotor drive lug by means of a rivet or similar fastener. Half cap clips are also known, which are over just the end part of the drive lug. Floating clips are also known, which are positioned between drive lugs and allow for some movement of the clip during braking. Again, these clips are secured in position by means of rivets or pins or similar fasteners.

As high torques are transferred by the clip, the fasteners securing the clips in place are also subject to high forces acting perpendicular to the force to be transmitted to the clip and these rivets/pins are subject to bending or breakage due to these forces. Furthermore, such fasteners will have a head that protrudes beyond the surface of the clip which can also be damaged or can cause damage to other parts. The force on the fasteners and the forces exerted by the fasteners in known designs might not be equally distributed and hot spots can be created where the fasteners exert forces on the clip or the rotor, thus causing damage to the clip and/or rotor disk. Rivets that can provide the required strength and security are expensive and difficult to manufacture and use. The use of these rivets also introduces the risk of damage to the rotor disk material when the clips are being replaced.

There is a need for an improved clip that avoids or mitigates these problems.

SUMMARY

According to the disclosure, there is provided a clip for a rotor disk of a brake assembly, the clip comprising: a first half comprising a first sheet metal strip having a body portion and a first end and a second end bent in a first direction relative to the body portion; and a second half comprising a second sheet metal strip having a body portion having a length the same as the length of the body portion of the first sheet metal strip, the second sheet metal strip having a first end and a second end bent in a second direction, opposite to the first direction, relative to the body portion of the second sheet metal strip; and wherein one of the first end of the first sheet metal strip and the first end of the second sheet metal strip is provided with a first pin protruding from the end and the other of the first end of the first sheet metal strip and the second sheet metal strip is provided with a first aperture configured to receive the first pin when the first and second sheet metal strips are assembled such that their first ends overlap; and wherein one of the second end of the first sheet metal strip and the second end of the second sheet metal strip is provided with a second pin protruding from the end and the other of the second end of the first sheet metal strip and the second sheet metal strip is provided with a second aperture configured to receive the second pin when the first and second sheet metal strips are assembled such that their second ends overlap.

Also provided is a method for assembling such a clip, as well as a rotor disk, a brake assembly and a wheel assembly having such a clip design.

BRIEF DESCRIPTION OF THE DRAWINGS

Examples of the clip according to the disclosure will now be described with reference to the drawings. It should be noted that other examples are possible within the scope of the claims.

DETAILED DESCRIPTION

Figure 1:
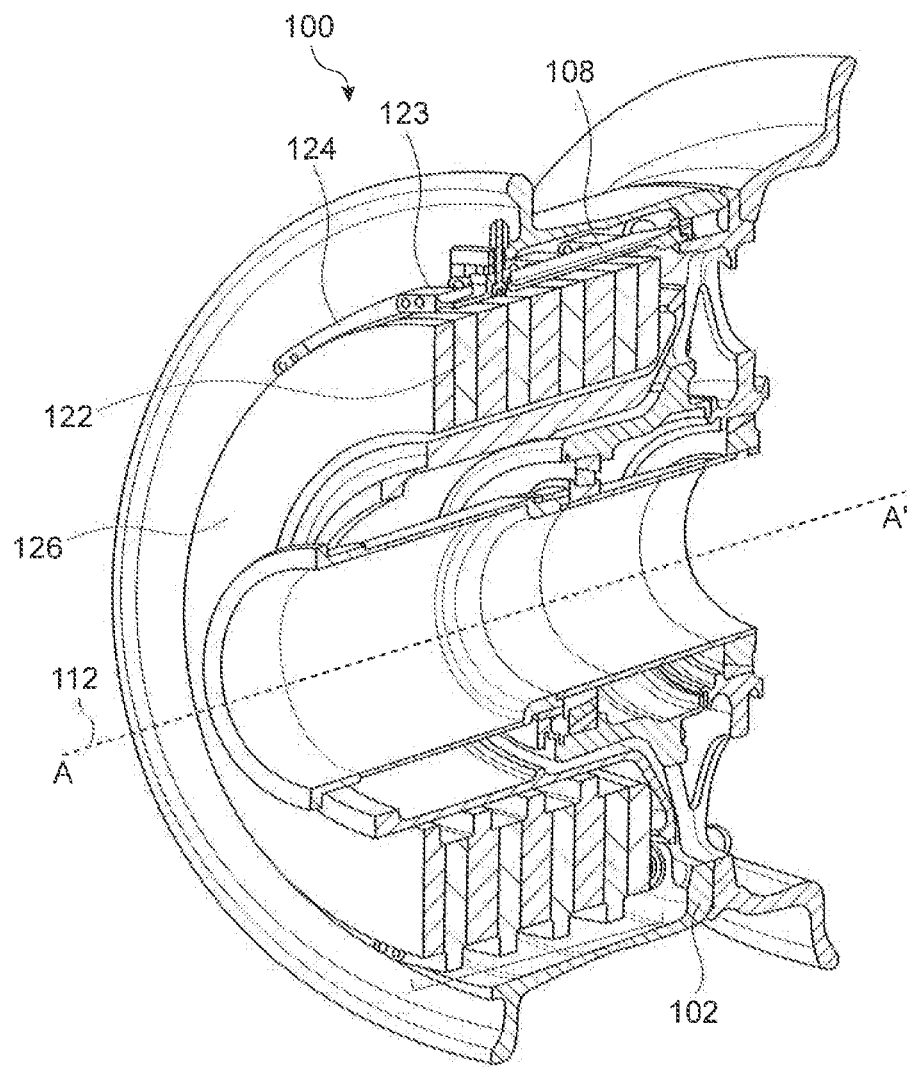
FIG. 1 is a perspective view of a section through a typical brake assembly.

Referring first to FIG. 1, a wheel brake assembly is shown for purposes of explanation. The brake assembly 100 is mounted within a wheel 102 which rotates about an axis A-A' 112. The brake assembly comprises a stack of alternate rotor disks 122 and stator disks 126 with the rotor disks rotatable with the wheel, and relative to the stator disks, about axis 112. To decelerate or brake rotation of the wheel pressure is applied by means of actuators in the axial direction A-A' to the brake stack to compress the rotor and stator disks together, causing friction between the rotor and stator disks and thus slowing the wheel. The rotor disks have rotor lugs 124 defined around their circumference and extending radially outwards with respect to the axis of rotation 112. Torque bars 108 acts as drive lugs that engage the wheel with the rotor disks via the rotor lugs.

As mentioned above, in order to protect the rotor disk material against wear, the rotor lugs 124 may be provided with protective clips 123 via which the torque is transferred from the torque bars 108 to the rotor lugs 124, and hence to the rotor disk. During use, the operation of the brake assembly will cause the brake clips 123 to wear before the rotor disk material wears, and the clips 123 can be removed and new clips fitted, without needing to replace the entire rotor disk.

Conventionally, these clips are attached to the rotor disks or rotor lugs by means of rivets. An example of such known clip designs is shown in FIG. 2.

Figure 2:
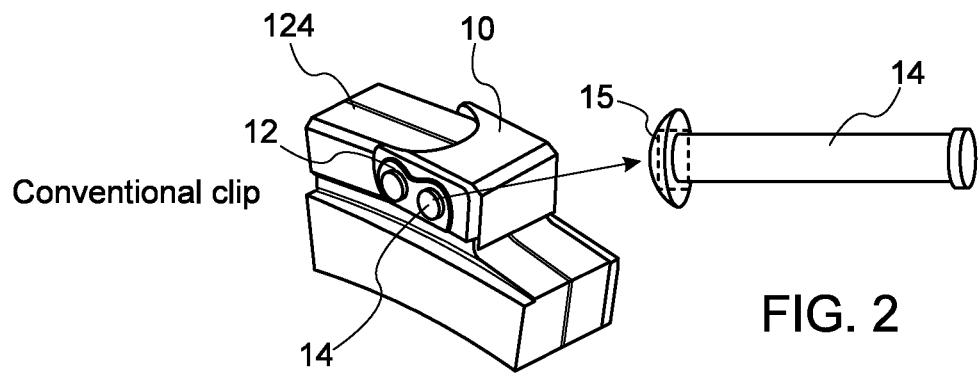
FIG. 2 shows a conventional clip with a rivet fastener.
Figure 3A:
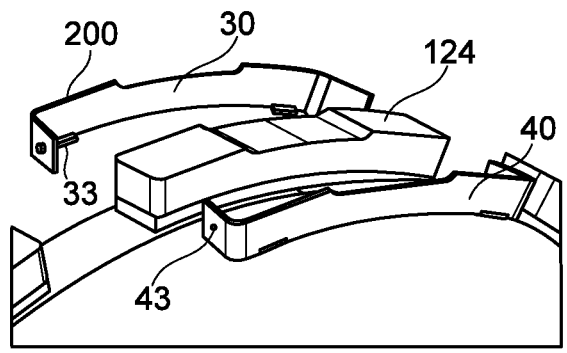
FIG. 3A is a perspective side view showing a clip according to the disclosure, being assembled.
Figure 3B:
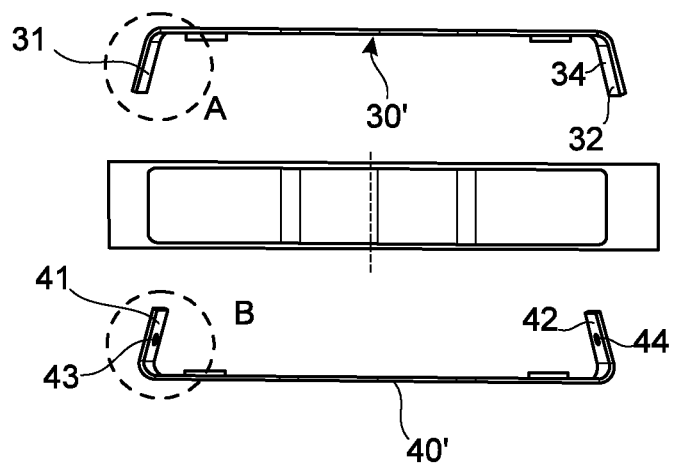
FIG. 3B shows the clip being assembled from a top view.
Figure 4A:
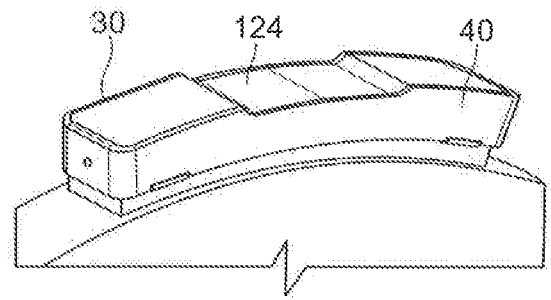
FIG. 4A shows a clip such as shown in FIGS. 3A and 3B, when attached to a rotor lug.
Figure 4B:
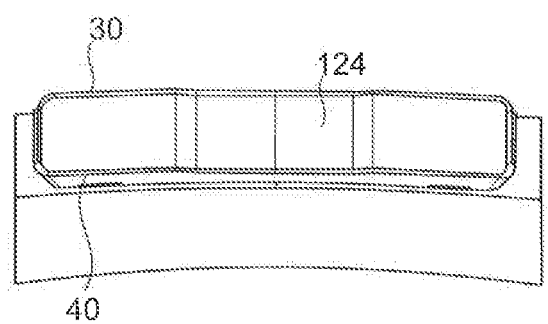
FIG. 4B shows the attached clip from a top view.
Figure 5:
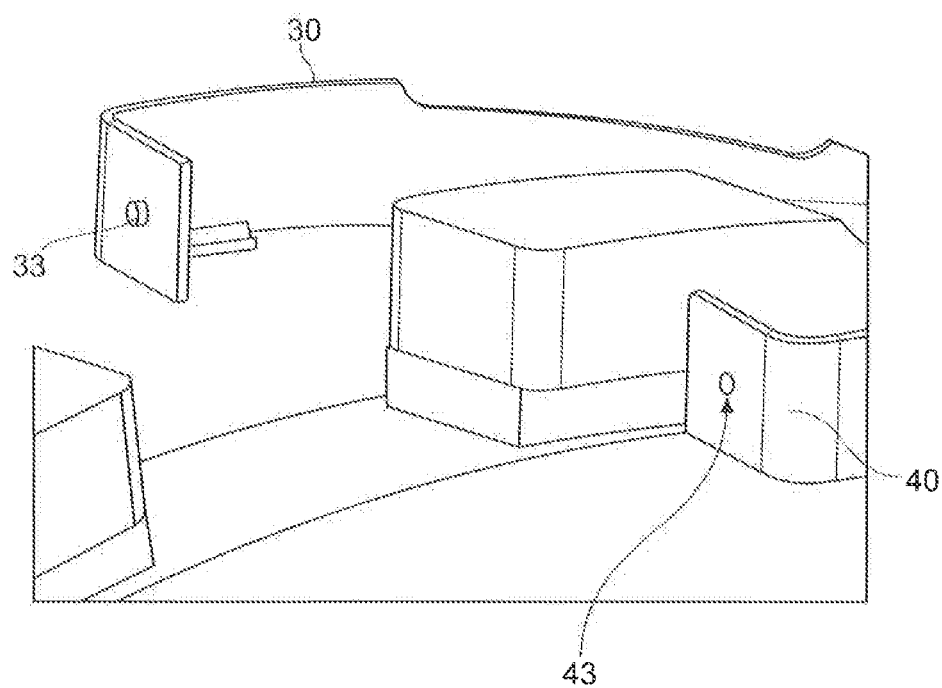
FIG. 5 shows a close up view of the fastening features of the clip of FIGS. 3A, 3B, 4A and 4B.

FIG. 2 shows a conventional clip 10 which has at least one rivet aperture 12 (in this example, there are two rivet apertures 12). The conventional clip 10 is shaped to fit over the end of a rotor lug 124 and is secured to the lug by means of rivets 14 secured to the side of the lug through the clip apertures 12. As mentioned above, these rivets can be expensive and difficult to manufacture and install and a hotspot of force can occur around the region of the rivet head 15.

The clip according to the present disclosure, described below with reference to FIGS. 3A, 3B, 4A, 4B and 5, avoids the need for rivets for fastening the clip to the rotor disk.

The clip 200 according to the disclosure is formed from two complementary strips of flexible sheet metal 30, 40, each formed to match the shape of one side of a rotor lug 124 and each defining a body 30', 40' between two ends 31, 32, 41, 42 such that when assembled, a first end 31 of a first of the two strips 30 overlaps a first end 41 of the second strip 40 at an end of the rotor lug and a second end 32 of the first strip and a second end 42 of the second strip 40 overlap at the other end of the rotor lug, and wherein the overlapping first ends 31,41 are secured together by means of a first pin 33 protruding from one of the first ends 31, 41 and a first aperture 43 formed in the other of the first ends 41, 31 within which the first pin 33 locates, and the overlapping second ends 32,42 are secured together by means of a second pin 34 protruding from one of the second ends 32, 42 and a second aperture 44 formed in the other of the second ends 42, 32 within which the second pin 34 locates.

The two complementary strips of flexible sheet material are formed of a material that has some resilience and are formed by bending the ends 31, 32 of the first strip 30 in a first direction and by bending the ends 41, 42 of the second strip 42 in an opposite direction such that the strips have some degree of pre-tensioning due to the bending so that when they are fitted together the resilience of the strips biases the ends together such that the pins and the apertures engage and remain in engagement.

To assemble the clip 200 onto the rotor lug 124, the first strip 30 is fitted along a first side of the lug 124 and the second strip 40 is fitted along the opposite side of the lug 124. The first and second ends 41, 42 of the second strip 40 are slightly opened out away from the lug and are then fitted over the first and second ends 31, 32 such that the pins 33, 34 protruding from the first 31 and second 32 ends of the first strip 30 at the ends of the lug are received in the apertures 43, 44 formed in the first 41 and second 42 ends of the second strip 40 as the ends of the second strip elastically move back in towards the ends of the lug 124. The strips 30, 40 are dimensioned such that when the pins are engaged in the apertures, the combined clip 200 fits snugly around the rotor lug 124 and is held in a form fitting engagement to the lug.

Forming the clip 200 of two sheet metal halves makes it simple and inexpensive to manufacture and install and to remove, as needed.

The clip is simple and lightweight and offers good thermal behaviour in that all parts are made of the same material, thus avoiding hot spots. Because the fastening pin and aperture are formed in the metal strips, no additional fasteners are required adding to the simplicity, light weight and low cost of the clip.

What is claimed is:

1. A clip for a rotor disk of a brake assembly, the clip comprising: a first half comprising a first sheet metal strip having a body portion and a first end and a second end bent in a first direction relative to the body portion; and a second half comprising a second sheet metal strip having a body portion having a length the same as the length of the body portion of the first sheet metal strip, the second sheet metal strip having a first end and a second end bent in a second direction, opposite to the first direction, relative to the body portion of the second sheet metal strip; and wherein one of the first end of the first sheet metal strip and the first end of the second sheet metal strip is provided with a first pin protruding from the end and the other of the first end of the first sheet metal strip and the second sheet metal strip is provided with a first aperture configured to receive the first pin when the first and second sheet metal strips are assembled such that their first ends overlap; and wherein one of the second end of the first sheet metal strip and the second end of the second sheet metal strip is provided with a second pin protruding from the end and the other of the second end of the first sheet metal strip and the second sheet metal strip is provided with a second aperture configured to receive the second pin when the first and second sheet metal strips are assembled such that their second ends overlap.

2. A method of providing a clip to a rotor disk of a brake assembly, the method comprising fitting a first sheet metal strip having a body portion and a first end and a second end bent in a first direction relative to the body portion to a first side of a lug of the rotor; fitting a second sheet metal strip having a body portion having a length the same as the length of the body portion of the first sheet metal strip, to a second, opposite side of the lug of the rotor, the second sheet metal strip having a first end and a second end bent in a second direction, opposite to the first direction, relative to the body portion of the second sheet metal strip; overlapping the first ends of the first and second metal strips and overlapping the second ends of the first and second metal strips, securing the first end of the first metal strip and the first end of the second metal strip together by receiving a pin provided on one of the first ends in an aperture provided in the other of the first ends; and securing the second end of the first metal strip and the second end of the second metal strip together by receiving a pin provided on one of the second ends in an aperture provided in the other of the second ends.

3. A rotor disk of a brake assembly provided with a plurality of rotor lugs around and radially extending from its circumference; and the clip as claimed in claim 1 mounted to each rotor lug.

4. The brake assembly comprising a plurality of rotor disks as claimed in claim 3 and a plurality of stator disks, the stator disks and the rotor disks arranged alternately to form a brake stack.

5. The wheel assembly comprising a wheel having an inner diameter within which is mounted a brake assembly as claimed in claim 4.

6. The wheel assembly as claimed in claim 5, the wheel having an outer diameter onto which a tire is mounted.

7. The wheel assembly as claimed in claim 5 being a wheel assembly for the landing gear of an aircraft.

* * * * *